(12) United States Patent
Wells

(10) Patent No.: US 7,132,603 B2
(45) Date of Patent: Nov. 7, 2006

(54) ELECTRICAL CONNECTION DEVICE

(75) Inventor: Mark Wells, Dudley (AU)

(73) Assignee: Head Electrical International Pty, Dudley (AU)

( * ) Notice: Subject to any disclaimer, the term of this patent is extended or adjusted under 35 U.S.C. 154(b) by 0 days.

(21) Appl. No.: 10/485,798

(22) PCT Filed: Aug. 8, 2002

(86) PCT No.: PCT/AU02/01066

§ 371 (c)(1),
(2), (4) Date: Aug. 30, 2004

(87) PCT Pub. No.: WO03/015219

PCT Pub. Date: Feb. 20, 2003

(65) Prior Publication Data

US 2005/0130511 A1  Jun. 16, 2005

(30) Foreign Application Priority Data

Aug. 8, 2001  (AU) .................................. PR6903

(51) Int. Cl.
*H02G 3/06*  (2006.01)

(52) U.S. Cl. ..................................... 174/90; 174/128.1

(58) Field of Classification Search .............. 174/74 R, 174/84 C, 90, 128.1, 128.2; 439/877, 930, 439/472, 874
See application file for complete search history.

(56) References Cited

U.S. PATENT DOCUMENTS

| 2,427,518 | A | * | 9/1947 | Bergan ....................... 439/880 |
| 2,959,436 | A | * | 11/1960 | Duda ......................... 403/275 |
| 3,184,535 | A | * | 5/1965 | Worthington ................ 174/90 |
| 3,399,270 | A | * | 8/1968 | Stoddard ..................... 174/90 |
| 3,710,000 | A | * | 1/1973 | Shattes et al. ........... 174/125.1 |
| 4,963,694 | A | | 10/1990 | Alexion et al. |
| 5,154,637 | A | | 10/1992 | Klug et al. |
| 5,378,855 | A | | 1/1995 | Delalle |

FOREIGN PATENT DOCUMENTS

JP  2000057855 A  2/2000

* cited by examiner

*Primary Examiner*—Chau N. Nguyen
(74) *Attorney, Agent, or Firm*—Timothy J. Keefer; Seyfarth Shaw LLP

(57) ABSTRACT

The present invention provides an electrical connection device. The device comprises a pin, socket or lug and a means for electrically connecting the pin, socket or lug to groups of strands of an individual multi-bunch core of a machine, reeling or trailing cable. The means is divided into a plurality of portions and each portion is arranged to receive at least one group of strands wherein, in use, the portions are individually connected to the or each respective group of strands whereby the strength of the connection is improved.

23 Claims, 3 Drawing Sheets

ELECTRICAL CONNECTION DEVICE

CROSS REFERENCE TO RELATED APPLICATION

This application is a U.S. National Phase of International Patent Application Number PCT/AU02/01066, which claims priority of Australian Patent Application Ser. No. PR 6903, filed Aug. 8, 2001.

FIELD OF THE INVENTION

The present invention broadly relates to an electrical connection device for a machine, reeling or trailing cable and to a method of connecting the machine, reeling or trailing cable to an electrical connection device.

BACKGROUND OF THE INVENTION

Machine, reeling or trailing cables are typically used to provide an electrical connection for mobile electrical machines. For example, in the mining or petroleum industry often large electrical machinery is used and each machine, reeling or trailing cable may have to provide power in the order of a few hundred kilowatts. Typically such power is delivered with a voltage of one or more kilovolts and the cables are usually formed from a plurality of bunches of individual copper strands. For example, machine, reeling or trailing cable type 240.3 fabricated by Pirelli Cables Australia Limited comprises three main core conductors which each comprise 19 bunches of 13 or 14 strands of copper fibres, the fibres having an individual diameter of 0.67 mm. Even though the overall diameter of each multi-bunch core conductor of the cable is quite large (typical cross-sectional areas range from 50 to 120 $mm^2$), the moveability of the bunches with respect to each other results in flexibility which makes the cable useful for mobile machinery that requires high power.

FIG. 1 shows a schematic cross-sectional representation of a typical cable connection used to connect such machine, reeling or trailing cables. The Figure shows a plug 12 and a receptacle 10, the plug 12 being connected to a machine, reeling or trailing cable 14. Two multi-bunch cores 16 and 18 are connected to respective sockets 20 and 22. The cable is held in position within the plug 12 by a sealing bush 24.

SUMMARY OF THE INVENTION

Broadly defined the present invention provides an electrical connection device, the device comprising:
   a pin, socket or lug,
   a means for electrically connecting the pin, socket or lug to groups of strands of a multi-bunch core of a machine, reeling or trailing cable, the means being divided into a plurality of portions, each portion being arranged to receive at least one group of strands, wherein, in use, the portions are individually connected to the or each respective group of strands whereby the strength of the connection is improved.

The inventor has observed that the usual way of locating a machine, reeling or trailing cable in a plug or receptacle using a sealing bush has disadvantages. The sealing bush squeezes the cable and therefore locally reduces the thickness of insulation layers. However, the thickness of the insulation layers is a critical parameter for the safety of such high voltage machine, reeling or trailing cables. The reduction of the thickness of these layers effects the dielectric properties of the insulation and reduces the voltage at which electrical failure may occur. This could result in arcing and electrical ignition which, in an environment that may contain explosive gases such as a mine, increases the risk of explosions. In addition, the deformation of insulating layers may allow moisture to ingress which also results in safety risks. Further, mechanical stress applied to the sealing bush reduces mechanical durability of the cable which again relates to safety issues.

The above-defined electrical connection device results in improved connection strength between the machine, reeling or trailing cable and the pin, socket or lug. At least in some cases the improved connection strength would be sufficient to hold the cable in position and, in this case, a sealing bush would be redundant. The above identified safety issue can therefore be avoided.

The present invention also provides a method for connecting a machine, reeling or trailing cable to an electrical connection device, the method comprising the steps of:
   dividing bunches of strands of a multi-bunch core of the machine, reeling or trailing cable into groups of strands and
   connecting the groups of strands to respective portions of a means for electrically connecting a pin, socket or lug to the groups of strands wherein the groups of strands are connected individually to the respective portions whereby the connection strength is improved.

PREFERRED FEATURES OF THE INVENTION

In one preferred embodiment of the above-defined device each portion is arranged to receive one bunch of strands of the multi-bunch core. In this case each portion preferably is a separate part separate to and individually connected to the socket, plug or lug.

In another preferred embodiment of the device, each portion may comprise an aperture arranged to receive the or each group of strands. The apertures preferably have a succession of cross-sectional dimensions and are arranged concentrically around a common axis. Alternatively the portions may be disposed annularly around an axis. In this case the portions preferably are bores and are arranged in zones which have different radial distances from the axis.

The portions preferably is arranged for connection to the or each group of strands by crimping. Alternatively, the portions may be arranged for connection to the or each group of strands by, welding, soldering or by a clamping mechanism including a screw.

The pin, socket or lug may be one of a plurality and the means for electrically connecting the pin, socket or lug to groups of strands may be one of a plurality with each means being associated with a respective one of the pins, sockets or lugs.

In the above-defined method the step of dividing the bunches into groups of strands may comprise dividing the bunches into groups corresponding to concentric zones of bunches of the individual multi-bunch core. The bunches of strands may also be divided into groups of individual bunches.

The step of connecting preferably includes crimping. Alternatively, this step may include welding, soldering or clamping using a mechanism comprising a screw.

The invention may be more fully understood from the following description of embodiments of the invention. The description is provided with reference to the accompanying drawings.

DETAILED DESCRIPTION OF PREFERRED EMBODIMENT

Figure 1:
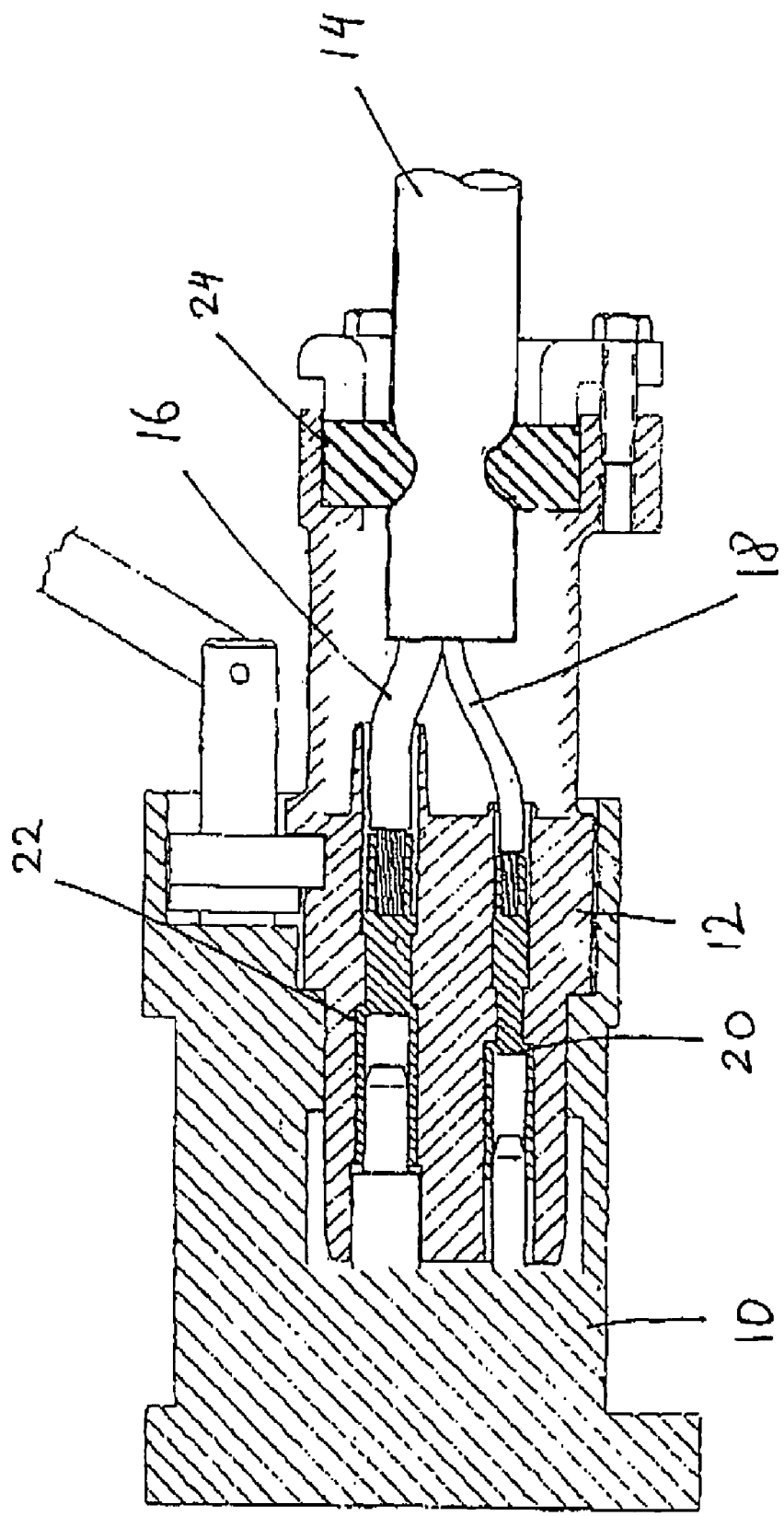
FIG. 1 shows a cross-sectional schematic representation of a cable connection system (prior art)
Figure 2:
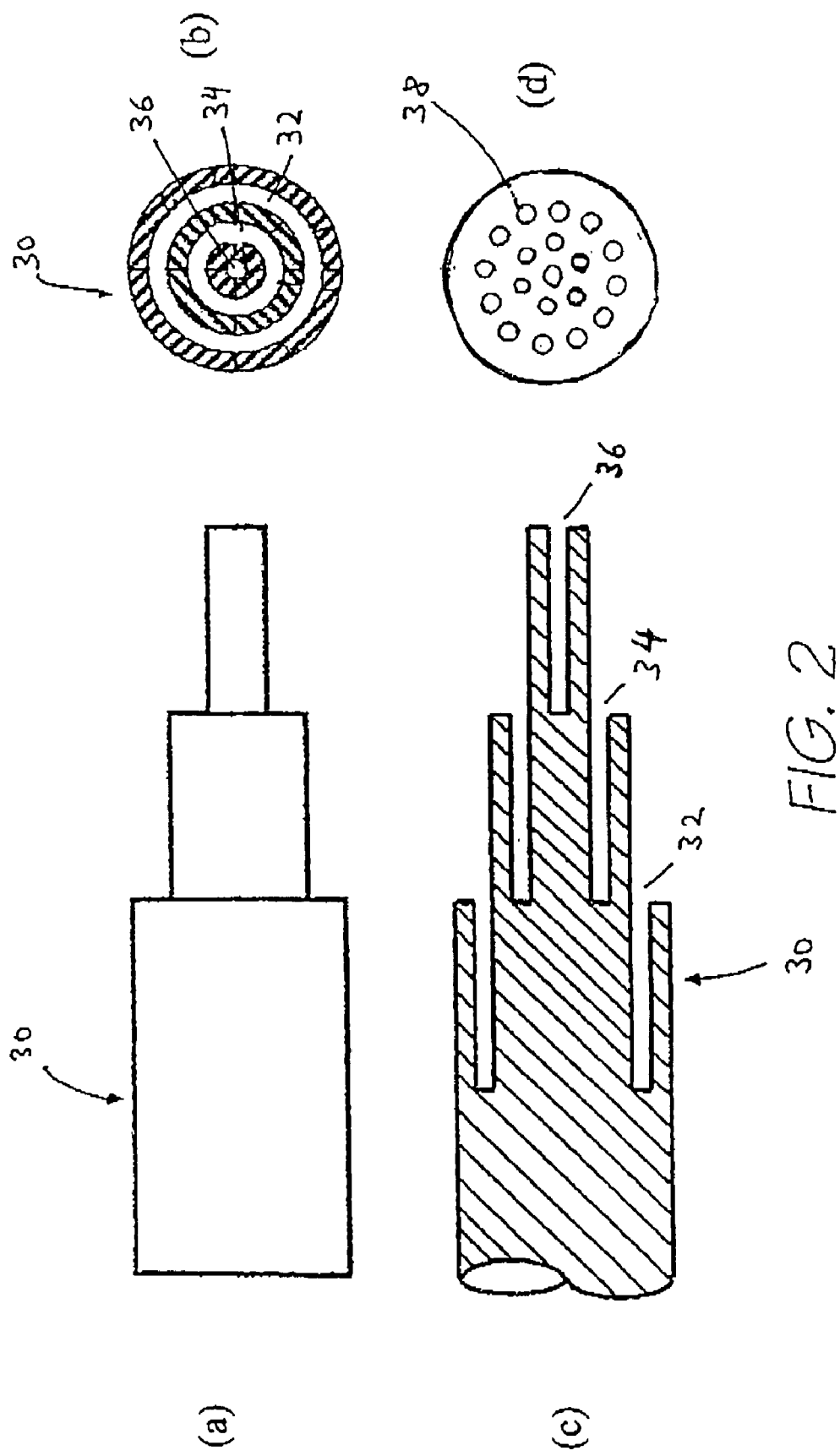
FIG. 2 shows (a) a schematic side view, (b) a schematic end view of a component of an electrical connection device according to a specific embodiment and (c) a schematic longitudinal sectional view, (d) a schematic cross-sectional view of another variation of the component

Referring to FIG. 2, an electrical connection device according to a first preferred embodiment of the present invention and a preferred method of connecting such a device to a machine, reeling or trailing cable is now described. FIG. 2 (a) shows a side-view, (b) an end view and (c) a sectional view of a connection component 30 of the device. In use, the connection component 30 connects a pin, socket or lug of the device with bunches of strands of a machine, reeling or trailing cable. The connection component 30 is formed from a metallic body and has a substantially circular cross-section. In this example the connection component 30 has a plurality of apertures 32, 34 and 36 and is connected to a pin, socket or lug (not shown).

FIG. 2(d) shows a schematic cross-sectional representation of a variation of the component 30. In this case the component 30 comprises a plurality of bores 38 arranged in three zones and positioned around a common axis. In the preferred case, a first centre zone comprises one bore, an intermediate zone comprises 6 bores and third outer zone comprises 12 bores. Each bore is arranged to receive one individual bunch of strands of a multi-bunch core of a machine, reeling or trailing cable.

A typical machine, reeling or trailing cable may comprise 19 bunches of 13 or 14 strands of copper fibres. The 19 bunches are usually ordered in three concentric zones. A first centre zone may comprise one bunch of strands, a second zone may comprise six bunches of strands and a third outer zone may comprise 12 bunches of strands. When the machine, reeling or trailing cable is connected to the above-defined device, the bunches are divided into three groups corresponding to the zones. The bunches are then cut to appropriate lengths. If the connection component 30 comprises apertures, the bunch associated with the first zone is inserted into aperture 36, the bunches associated with the second zone are inserted into aperture 34 and the bunches associated with the third zone are inserted into aperture 32. Alternatively, if the connection component 30 comprises bores, the bunches are inserted into bores of respective zones (see FIG. 2(d)). The apertures 32, 34 and 36 and/or the bores 38 are then hydraulically crimped such that a permanent connection between the connection component 30 and the bunches of strands is established.

Figure 3:
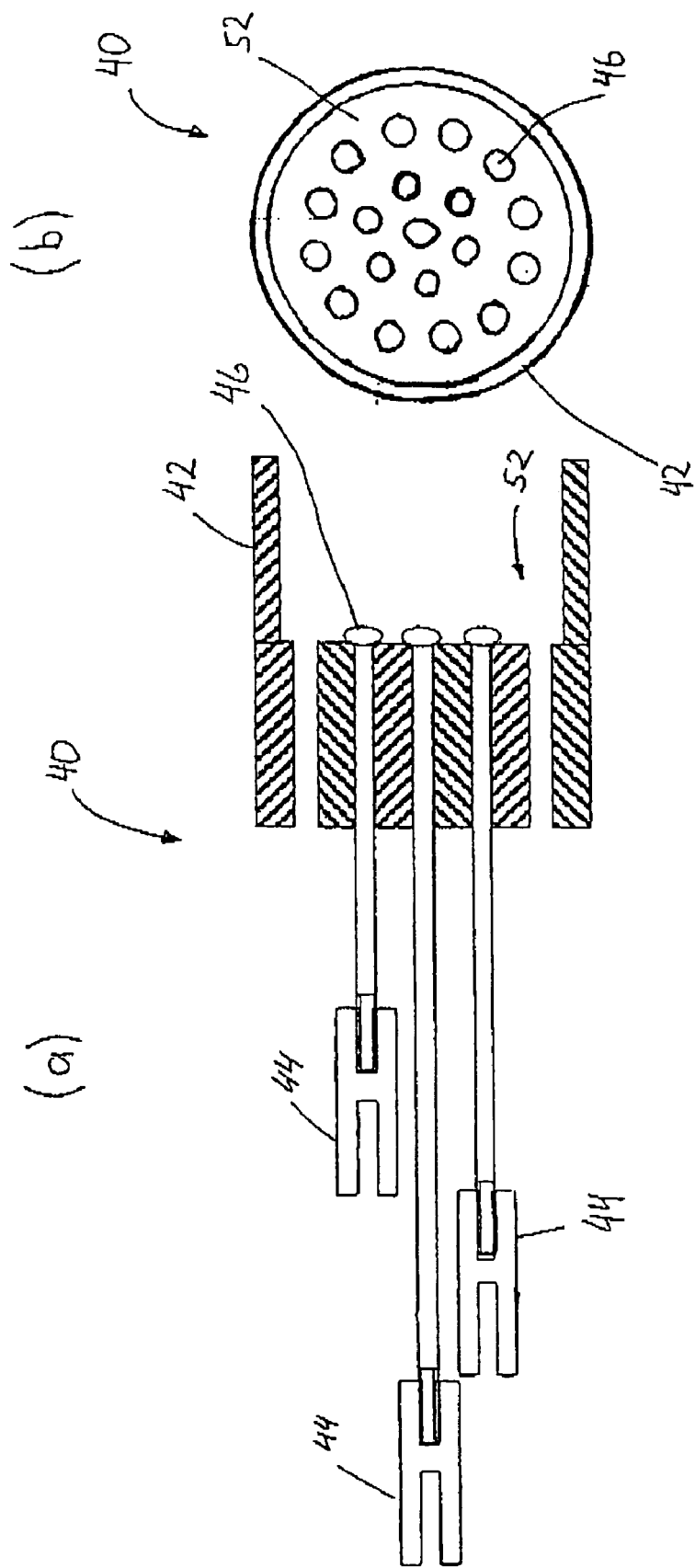
FIG. 3 shows (a) a schematic longitudinal sectional view and (b) a view in a longitudinal direction of a component of an electrical connection device according to another embodiment of the present invention.

Referring to FIG. 3, an electrical connection device according to a second preferred embodiment of the present invention and a preferred method of connecting such a device to a machine, reeling or trailing cable is now described. FIG. 3(a) shows a longitudinal sectional view of a connection component 40 of the device and FIG. 3(b) shows a view of the connection component in a longitudinal direction. In use, the connection component 40 connects a pin, socket or lug of the device with bunches of strands of the machine, reeling or trailing cable. In this case the connection component 40 includes a metallic body 42. Separate connection units 44 are arranged to receive individual bunches of strands of the machine, reeling or trailing cable and are individually electrically connected to the metallic body 42 by pins 46. Face 52 of the metallic body 42 is connected to a pin, socket or lug (not shown).

When the machine, reeling or trailing cable is connected the above-defined device, the bunches are selected and cut to appropriate lengths. Individual bunches are then inserted into respective connection units 44 which are then hydraulically crimped such that a permanent connection between the connection component 40 and the bunches of strands is established.

It will be appreciate that the present invention is not limited to these preferred embodiments. For example, different types of machine, reeling or trailing cables may be used which may have more or less than 19 bunches of strands and the connection component 30 or 40 will be arranged appropriately. The connection component 40 may have any number of apertures and may have any shape. Similarly the connection component 40 may have any number of connection units 44 of various shapes and may be directly or indirectly connected to the metallic body 42.

It will also be appreciated that the step of crimping may be effected after all bunches have been inserted into respective apertures or connecting units or, alternatively, crimping may be effected after a bunch or bunches of strands have been inserted into an individual aperture or connection unit. It will further be appreciated that the connection between the machine, reeling or trailing cable and the pin, socket or lug may also be effected by crimping, welding, soldering or clamping.

The described electrical connection device and the method for connecting a machine, reeling or trailing cable to an electrical connection device may find application in a variety of different industries. Examples include mining, petroleum, gas, petrochemical and maritime industries as well as any other industry in which machine, reeling or trailing cables are used.

The invention claimed is:

1. An electrical connection device comprising:
a body for electrically connecting to groups of strands of a multi-bunch core of a machine, reeling or trailing cable, the body having a first end portion, a second end portion and a plurality of receiving portions;
each receiving portion being arranged to receive a groups of strands, each receiving portion having an opening disposed on an outwardly facing surface of the body and at least some of the openings being spaced at different distances from the second end portion so that groups of strands are separately receivable in and separately fixable to respective receiving portions at different distances from the second end portion.

2. The electrical connection device as claimed in claim 1, wherein the device is configured so as to be suitable for delivery of a few hundred kilowatts of power.

3. The electrical connection device as claimed in claim 1, wherein the second end portion comprises a pin, socket or lug.

4. The device as claimed in claim 3, wherein the pin, socket or lug is one of a plurality pins, sockets or lugs and the body is one of a plurality of bodies and each body is associated with a respective one of the pins, sockets or lugs.

5. The device as claimed in claim 1, wherein each receiving portion is arranged to receive one bunch of strands of the multi-bunch core.

6. The device as claimed in claim 1, wherein the receiving portions are disposed annularly around an axis.

7. The device as claimed in claim 6, wherein at least some of the receiving portions are disposed at different radial distances from the axis.

8. The device as claimed in claim 7, wherein the receiving portions are bores.

9. The device as claimed in claim 1, wherein each receiving portion comprises an annular aperture.

10. The device as claimed in claim 9, wherein the annular apertures are arranged concentrically around a common axis, the annular apertures being disposed at different radial distances from the common axis.

11. The device as claimed in claim 1, wherein each receiving portion is a part separate to and individually connected to a socket, pin or lug.

12. The device as claimed in claim 1, wherein the receiving portions are arranged for connection to the or each group of strands by crimping.

13. The device as claimed in claim 1, wherein the receiving portions are arranged for connection to the groups of strands by welding.

14. The device as claimed in claim 1, wherein the receiving portions are arranged for connection to the groups of strands by soldering.

15. The device as claimed in claim 1, wherein the receiving portions are arranged for connection to the groups of strands by a clamping mechanism including a screw.

16. A method for connecting a machine, reeling or trailing cable to an electrical connection device, the method comprising the steps of:

dividing bunches of strands of a multi-bunch core of the machine, reeling or trailing cable into groups of strands; and connecting the groups of strands to a body, the body having a first end portion, a second end portion and a plurality of receiving portions, each receiving portion having an opening disposed on an outwardly facing surface of the body and at least some of the openings being spaced at different distances from the second end portion so that groups of strands are separately receivable in and separately fixable to respective receiving portions at different distances from the second end portion;

the groups of strands being connected individually to respective receiving portions in a manner such that the groups of strands are spaced apart from the second end portion by different distances.

17. The method as claimed in claim 16, wherein the step of dividing the bunches into groups of strands comprises dividing the bunches into groups corresponding to concentric zones of bunches of the individual multi-bunch core.

18. The method as claimed in claim 16, wherein the bunches of strands are a divided into groups of individual bunches.

19. The method as claimed in claim 16, wherein the step of connecting includes crimping.

20. The method as claimed in claim 19, wherein crimping of an individual zone is effected after a bunch of strands has been inserted into a receiving portion.

21. The method as claimed in claim 16, wherein the step of connecting includes welding.

22. The method as claimed in claim 16, wherein the step of connecting includes soldering.

23. The method as claimed in claim 16, wherein the step of connecting includes clamping using a mechanism including a screw.

* * * * *